United States Patent
Hardikar et al.

(10) Patent No.: US 9,350,288 B2
(45) Date of Patent: May 24, 2016

(54) PHOTOVOLTAIC MODULE SUPPORT CLAMP ASSEMBLY

(71) Applicant: Apollo Precision (Kunming) Yuanhong Limited, Kunming, Yunan (CN)

(72) Inventors: Kedar Hardikar, Santa Clara, CA (US); Ashraf Khan, San Francisco, CA (US); Roger Balyon, San Jose, CA (US)

(73) Assignee: Beijing Apollo Ding Rong Solar Technology Co., Ltd., Beijing (CN)

( * ) Notice: Subject to any disclaimer, the term of this patent is extended or adjusted under 35 U.S.C. 154(b) by 0 days.

(21) Appl. No.: 14/679,908

(22) Filed: Apr. 6, 2015

(65) Prior Publication Data

US 2016/0065117 A1 Mar. 3, 2016

Related U.S. Application Data

(63) Continuation of application No. 12/895,328, filed on Sep. 30, 2010, now Pat. No. 9,074,796.

(51) Int. Cl.
*H02S 20/23* (2014.01)
*F24J 2/52* (2006.01)
*H01L 31/042* (2014.01)

(52) U.S. Cl.
CPC ............... *H02S 20/23* (2014.12); *F24J 2/5205* (2013.01); *F24J 2/5258* (2013.01); *H02S 20/00* (2013.01)

(58) Field of Classification Search
CPC ........ H02S 20/23; H02S 20/00; F24J 2/5205; F24J 2/5258; F24J 2/5256; F24J 2/5254
See application file for complete search history.

(56) References Cited

U.S. PATENT DOCUMENTS

| | | |
|---|---|---|
| 3,682,516 A | 8/1972 | Savage |
| 4,832,001 A | 5/1989 | Baer |
| 4,942,865 A | 7/1990 | Pierce-Bjorklund |
| 5,043,024 A | 8/1991 | Cammerer et al. |
| 5,125,608 A | 6/1992 | McMaster et al. |
| 5,460,660 A | 10/1995 | Albright et al. |
| 5,478,407 A | 12/1995 | Dorison et al. |
| 5,505,788 A | 4/1996 | Dinwoodie |
| 5,746,839 A | 5/1998 | Dinwoodie |
| 6,082,060 A | 7/2000 | Bauer et al. |
| 6,201,179 B1 | 3/2001 | Dalacu |
| 6,672,018 B2 | 1/2004 | Shingleton |
| 6,959,517 B2 | 11/2005 | Poddany et al. |
| 8,209,919 B2 | 7/2012 | Beck |
| 8,656,658 B2 | 2/2014 | Shufflebotham et al. |

(Continued)

FOREIGN PATENT DOCUMENTS

| | | |
|---|---|---|
| GB | 2049158 | 12/1980 |
| JP | 06-085302 | 3/1994 |

OTHER PUBLICATIONS

U.S. Appl No. 12/894,704, Office Action mailed Dec. 2, 2015.

(Continued)

*Primary Examiner* — Marla D McConnell
(74) *Attorney, Agent, or Firm* — Weaver Austin Villeneuve & Sampson LLP

(57) ABSTRACT

Apparatus and techniques for mounting frameless photovoltaic modules reduce module stress induced by the mounting configuration. Mounting clamps and rail/clamp spacing configured to relieve module stress by reducing or eliminating module sag are used.

20 Claims, 9 Drawing Sheets

(56) References Cited

U.S. PATENT DOCUMENTS

| | | | |
|---|---|---|---|
| 9,074,796 | B2 | 7/2015 | Hardikar et al. |
| 9,182,152 | B2 | 11/2015 | Hardikar et al. |
| 2002/0029799 | A1 | 3/2002 | Yoda et al. |
| 2003/0070368 | A1 | 4/2003 | Shingleton |
| 2005/0178428 | A1 | 8/2005 | Laaly et al. |
| 2006/0213571 | A1 | 9/2006 | Bean |
| 2006/0243318 | A1 | 11/2006 | Feldmeier et al. |
| 2008/0041442 | A1 | 2/2008 | Hanoka |
| 2008/0066801 | A1 | 3/2008 | Schwarze |
| 2008/0236567 | A1 | 10/2008 | Hayden |
| 2008/0236571 | A1 | 10/2008 | Keshner et al. |
| 2008/0244881 | A1 | 10/2008 | Zante |
| 2008/0302409 | A1 | 12/2008 | Bressler et al. |
| 2008/0308142 | A1 | 12/2008 | Grip et al. |
| 2008/0315061 | A1 | 12/2008 | Fath et al. |
| 2009/0114270 | A1 | 5/2009 | Stancel |
| 2009/0114271 | A1 | 5/2009 | Stancel |
| 2009/0250580 | A1 | 10/2009 | Strizki |
| 2009/0302183 | A1 | 12/2009 | Strizki |
| 2010/0038507 | A1 | 2/2010 | Schwarze et al. |
| 2010/0059641 | A1 | 3/2010 | Twesme et al. |
| 2010/0108113 | A1 | 5/2010 | Taggart et al. |
| 2010/0132766 | A1 | 6/2010 | Jenkins |
| 2010/0219304 | A1 | 9/2010 | Miros et al. |
| 2010/0237028 | A1 | 9/2010 | Cusson |
| 2010/0269428 | A1 | 10/2010 | Stancel et al. |
| 2011/0197954 | A1 | 8/2011 | Young et al. |
| 2011/0265861 | A1 | 11/2011 | Nabauer et al. |
| 2012/0080074 | A1 | 4/2012 | Hardikar et al. |
| 2012/0080075 | A1 | 4/2012 | Hardikar et al. |
| 2012/0080076 | A1 | 4/2012 | Hardikar et al. |
| 2012/0080077 | A1 | 4/2012 | Balyon et al. |
| 2012/0097207 | A1 | 4/2012 | Shufflebotham et al. |
| 2012/0234378 | A1 | 9/2012 | West et al. |
| 2012/0260977 | A1 | 10/2012 | Stancel |

OTHER PUBLICATIONS

Unirac Bright Thinking in Solar, latest press releases, "Unirac's solarmount—I chosen by arise solar for 200kW installation to power residential apartment complex", Unirac revolutionizes residential PV mounting with introduction of solarmount-I", Unirac launches non-penetrating attachment for seamed metal roofs", "Spire corporation chooses Unirac and CLICKSYS to support 1.6MW solar project", "Rosendin electric, Inc. selects Unirac to support 1.15MW San Jose international airport solar project", May 4, 2010-Aug. 30, 2010, downloaded from http://www.unirac.com on Sep. 30, 2010.

Schletter Inc., "Module clamps overview" catalogue, www.schletter-inc.us, update 2009.

International Search Report and Written Opinion mailed Apr. 24, 2012, for Application No. PCT US2011/053972.

International Search Report and Written Opinion mailed May 17, 2012, for Application No. PCT US2011/056637.

U.S. Appl. No. 12/894,704, Office Action mailed Jan. 16, 2013.
U.S. Appl. No. 12/908,778, Office Action mailed Apr. 10, 2013.
U.S. Appl. No. 12/895,328, Office Action mailed Jun. 7, 2013.
U.S. Appl. No. 12/895,594, Office Action mailed May 31, 2013.
U.S. Appl. No. 12/894,704, Office Action mailed Aug. 30, 2013.
U.S. Appl. No. 12/895,340, Office Action mailed Aug. 29, 2013.
U.S. Appl. No. 12/895,328, Office Action mailed Oct. 24, 2013.
Schierle, "Indeterminate beams," 2011, pp. 1-16.
U.S. Appl. No. 12/895,594, Office Action mailed Nov. 19, 2013.
U.S. Appl. No. 12/908,778, Notice of Allowance mailed Oct. 11, 2013.
U.S. Appl. No. 12/895,340, Office Action mailed Mar. 26, 2014.
U.S. Appl. No. 12/895,594, Office Action mailed Jun. 6, 2014.
U.S. Appl. No. 12/895,328, Office Action mailed Oct. 30, 2014.
U.S. Appl. No. 12/895,340, Office Action mailed Jan. 7, 2015.
U.S. Appl. No. 12/895,594, Office Action mailed Jan. 5, 2015.
U.S. Appl. No. 12/894,704, Office Action mailed Feb. 23, 2015.
U.S. Appl. No. 12/895,328, Notice of Allowance mailed Feb. 26, 2015.
U.S. Appl. No. 12/895,340 Notice of Allowance mailed Jul. 23, 2015.
U.S. Appl. No. 14/679,908, "Photovoltaic module support clamp assembly," Hardikar et al., filed Apr. 6, 2015.
U.S. Appl. No. 12/895,594, Notice of Allowance mailed Sep. 16, 2015.

PHOTOVOLTAIC MODULE SUPPORT CLAMP ASSEMBLY

CROSS REFERENCE TO RELATED APPLICATION

This application is a continuation of U.S. patent application Ser. No. 12/895,328, filed Sep. 30, 2010, titled PHOTOVOLTAIC MODULE SUPPORT CLAMP ASSEMBLY, now pending, the disclosure of which is incorporated by reference herein in its entirety.

BACKGROUND OF THE INVENTION

Photovoltaic cells are widely used for generation of electricity, with multiple photovoltaic cells interconnected in module assemblies. Such modules may in turn be arranged in arrays and integrated into building structures or otherwise assembled to convert solar energy into electricity by the photovoltaic effect. Arrays of modules are typically mounted on racking systems on the roofs of buildings or on ground-based structures. The modules are required to pass load testing to ensure that they can safely withstand snow loading and other environmental conditions. This can be challenging for frameless photovoltaic modules.

SUMMARY OF THE INVENTION

The invention relates generally to apparatus and techniques for mounting frameless photovoltaic modules to reduce module stress induced by the mounting configuration. The invention involves mounting clamps and rail spacing configured to relieve module stress by reducing or eliminating module sag.

In one aspect, the invention relates to a photovoltaic assembly. The photovoltaic assembly includes a frameless photovoltaic module having a frontside sheet and a backside sheet, a mounting structure having module mounting rails, and clamps attached to at least two of the mounting rails and clamped to the frontside sheet of the frameless photovoltaic module at edge regions of the frameless photovoltaic module overlying the at least two mounting rails, thereby securing the frameless photovoltaic module to the mounting structure. The assembly may also include a material disposed between the backside sheet and each of the at least two mounting rails to create a mechanical interface between the module and the backside sheet. The clamp may have a substantially L-shape.

Another aspect of the invention relates to a method of installing a frameless photovoltaic module having a frontside sheet and a backside sheet onto a mounting structure. The method involves providing the mounting structure comprising module mounting rails; and securing the frameless photovoltaic module onto the mounting structure with clamps attached to at least two rails of the mounting structure and engaging the frontside sheet of the frameless photovoltaic module at edge regions of the module overlying the at least two rails.

These and other aspects of the invention are described further below with reference to the figures.

DETAILED DESCRIPTION

Reference will now be made in detail to specific embodiments of the invention. Examples of the specific embodiments are illustrated in the accompanying drawings. While the invention will be described in conjunction with these specific embodiments, it will be understood that it is not intended to limit the invention to such specific embodiments. On the contrary, it is intended to cover alternatives, modifications, and equivalents as may be included within the spirit and scope of the invention. In the following description, numerous specific details are set forth in order to provide a thorough understanding of the present invention. The present invention may be practiced without some or all of these specific details. In other instances, well known mechanical apparatuses and/or process operations have not been described in detail in order not to unnecessarily obscure the present invention.

Frameless Photovoltaic Modules

Photovoltaic modules are required to meet load ratings specified by IEC 61646 and UL 1703, incorporated herein by reference for this purpose. In this regard, a module must be able to pass a 2400 MPa static load test for wind and 5400 MPa static loading test for snow/ice. This load testing requirement can be particularly challenging for a frameless photovoltaic module (a module without a metallic frame around its perimeter) to meet. Further, the structural stability and module integrity can be difficult to preserve in a racking system for frameless photovoltaic modules.

Figure 1A:
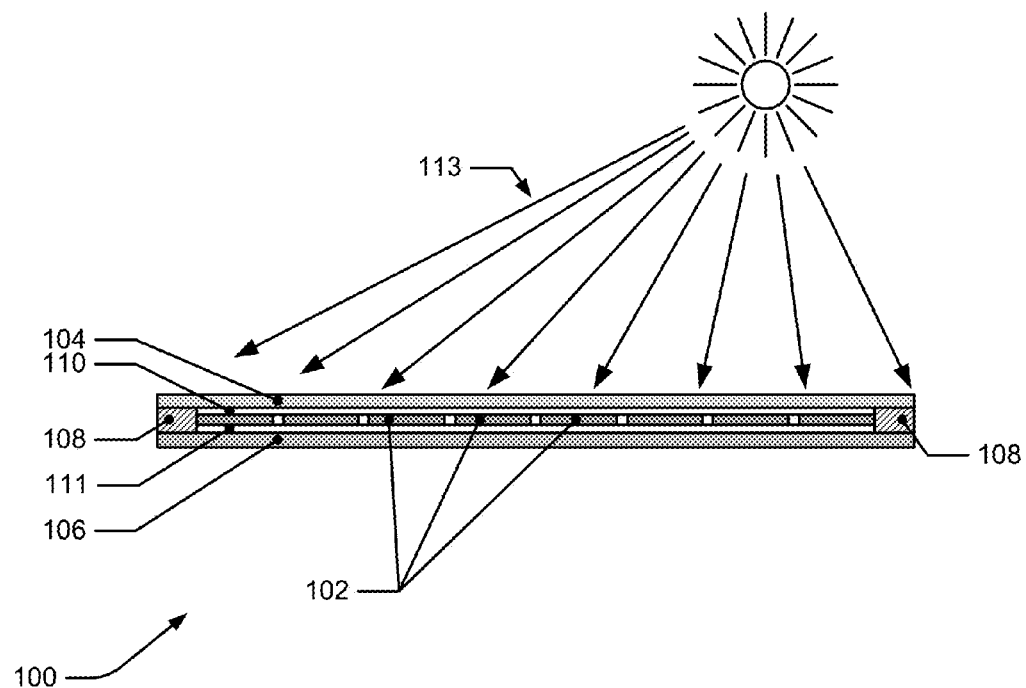
FIG. 1A shows a cross-sectional view of representative frameless photovoltaic module in accordance with the present invention.

Embodiments of the present invention relate to mounting of frameless photovoltaic modules (also referred to as solar modules or solar panels or, in this application, simply as modules), and associated racking systems and methods. FIG. 1A shows a not-to-scale cross-sectional view of certain components of a frameless solar module 100 in accordance with one embodiment of the present invention. The module 100 includes interconnected solar cells 102 and front (light-incident) and back layers 104 and 106, respectively, for environmental protection and mechanical support. A light-transmissive thermoplastic polymer encapsulant 110 is also provided between the solar cells 102 and the front layer 104 to provide electrical insulation and further protection to the underlying solar cells by preventing direct contact between the solar cells and the generally rigid front layer 104. The same or a different encapsulant layer 111 may also be provided between the solar cells 102 and the back layer 106 for the same reasons. In certain modules, an additional edge material 108 surrounds the solar cells 102, and in this example, is embedded within encapsulating layers 110 and 111.

The front and back layers may be any suitable material that provides the environmental protection and mechanical support required for reliable module operation. In some typical embodiments, the front and back layers are rigid plates, light transmitting in the case of the front layer, such as glass, although other materials, such as polymers, multi-layer laminates and metals that meet the functional requirements may also be used. In other embodiments the typical rigid back layer (e.g., back glass plate) can be replaced with a much lighter weight flexible material, thereby reducing handling costs associated with the module.

The front, light-incident layer 104 should transmit visible and near visible wavelengths of the solar spectrum 113 and be chemically and physically stable to anticipated environmental conditions, including solar radiation, temperature extremes, rain, snow, hail, dust, dirt and wind to provide protection for the module contents below. A glass plate comprising any suitable glass, including conventional and float glass, tempered or annealed glass, combinations thereof, or other glasses, is preferred in many embodiments. The total thickness of a suitable glass or multi-layer glass layer 104 may be in the range of about 2 mm to about 15 mm, optionally from about 2.5 mm to about 10 mm, for example about 3 mm or 4 mm. As noted above, it should be understood that in some embodiments, the front layer 104 may be made of a non-glass material that has the appropriate light transmission, stability and protective functional requirements. The front layer 104, whether glass or non-glass, transmits light in a spectral range from about 400 nm to about 1100 nm. The front layer 104 may not necessarily, and very often will not, transmit all incident light or all incident wavelengths in that spectral range equally. For example, a suitable front layer is a glass plate having greater than 50% transmission, or even greater than 80% or 90% transmission from about 400-1100 nm. In some embodiments, the front layer 104 may have surface treatments such as but not limited to filters, anti-reflective layers, surface roughness, protective layers, moisture barriers, or the like. Although not so limited, in particular embodiments the front layer 104 is a tempered glass plate about 3 mm thick.

The back layer 106 may be the same as or different than the front layer 104 and is also typically a glass plate as described above. However, since the back layer 106 does not have the same optical constraints as the front layer 104, it may also be composed of materials that are not optimized for light transmission, for example metals and/or polymers. And, while the present invention is applicable in more typical module configurations having both front and back glass plate layers, the invention finds particularly advantageous application in embodiments in which the back layer 104 is a lighter weight flexible material. Such lighter weight modules have manufacturing and transportation benefits, but can present additional challenges for module stability, including compliance with load testing requirements stresses induced by module mounting configurations. In such embodiments, the back layer 106 may be a flexible yet weatherable laminate that protects the photovoltaic cells and other module components from moisture, UV exposure, extreme temperatures, etc. The back layer laminate may include a weatherable back sheet exposed to the exterior of the module. The back sheet should be resistant to environmental conditions expected to be experienced by the module (e.g., temperatures of about −40 to 90° C.), so that it is stable throughout the range of temperate climate temperatures and conditions so as to retain its properties to perform its protective function.

The back sheet may be composed of a fluoropolymer, including but not limited to polyvinyl fluoride (PVF) (e.g., Tedlar® film available from DuPont), polyvinylidene fluoride (PVDF), ethylene-tetrafluoroethylene (ETFE), fluorinated ethylene-propylene (FEP), perfluoroalkoxy (PFA) and polychlorotrifluoroethane (PCTFE). Other weatherable materials may be used in addition to or instead of a fluoropolymer, including silicone polyesters, chlorine-containing materials such as polyvinyl chloride (PVC), plastisols, polyethylene terephthalate (PET), polypropylene, polybutylene, polybutylene terephthalate, and acrylics or combinations (laminated stacks) of the above. In certain embodiments, any material that meets UL 1703 requirements (incorporated by reference herein) can be used. In one example, the back layer includes PVF (e.g., Tedlar®). In certain examples, the thickness may range from about 2 to about 12 mils, although other thicknesses may be used as appropriate. A suitable flexible back layer laminate may also include a flexible moisture barrier sandwiched between an insulation sheet, for example a sheet of PET, and the weatherable back sheet. A suitable moisture barrier may be a metallic sheet, such as an aluminum foil. A suitable laminate back sheet in accordance with some embodiments of the invention is composed of a polyvinyl fluoride/Al foil/polyethylene terephthalate laminate (e.g., Tedlar®/Al foil/PET). Further description of suitable flexible back layers for photovoltaic cells that may be used in modules in accordance with the present invention is provided in U.S. Published Patent Application No. 2008/0289682 and U.S. Published Patent Application No. 2010-0071756, each of which is incorporated by reference herein for this purpose.

The edge material 108 may be an organic or inorganic material that has a low inherent water vapor transmission rate (WVTR) (typically less than 1-2 $g/m^2/day$) and, in certain embodiments may absorb moisture and/or prevent its incursion. In one example, a butyl-rubber containing a moisture getter or desiccant is used.

The solar cells 102 may be any type of photovoltaic cell including crystalline and thin film cells such as, but not limited to, semiconductor-based solar cells including microcrystalline or amorphous silicon, cadmium telluride, copper indium gallium selenide or copper indium selenide, dye-sensitized solar cells, and organic polymer solar cells. In particular embodiments, the cells are copper indium gallium selenide (CIGS) cells. In other aspects of the invention, the cells can be deposited as thin films on the front, light-incident (e.g., glass) layer 104. Direct deposition of a solar cell on glass is described, for example, in U.S. Published Patent Application No. 2009/0272437, incorporated by reference herein for this purpose. In such an embodiment, element 110 of FIG. 1A would be absent and element 102 would be in contact with the front, light-incident layer 104.

Figure 1B:
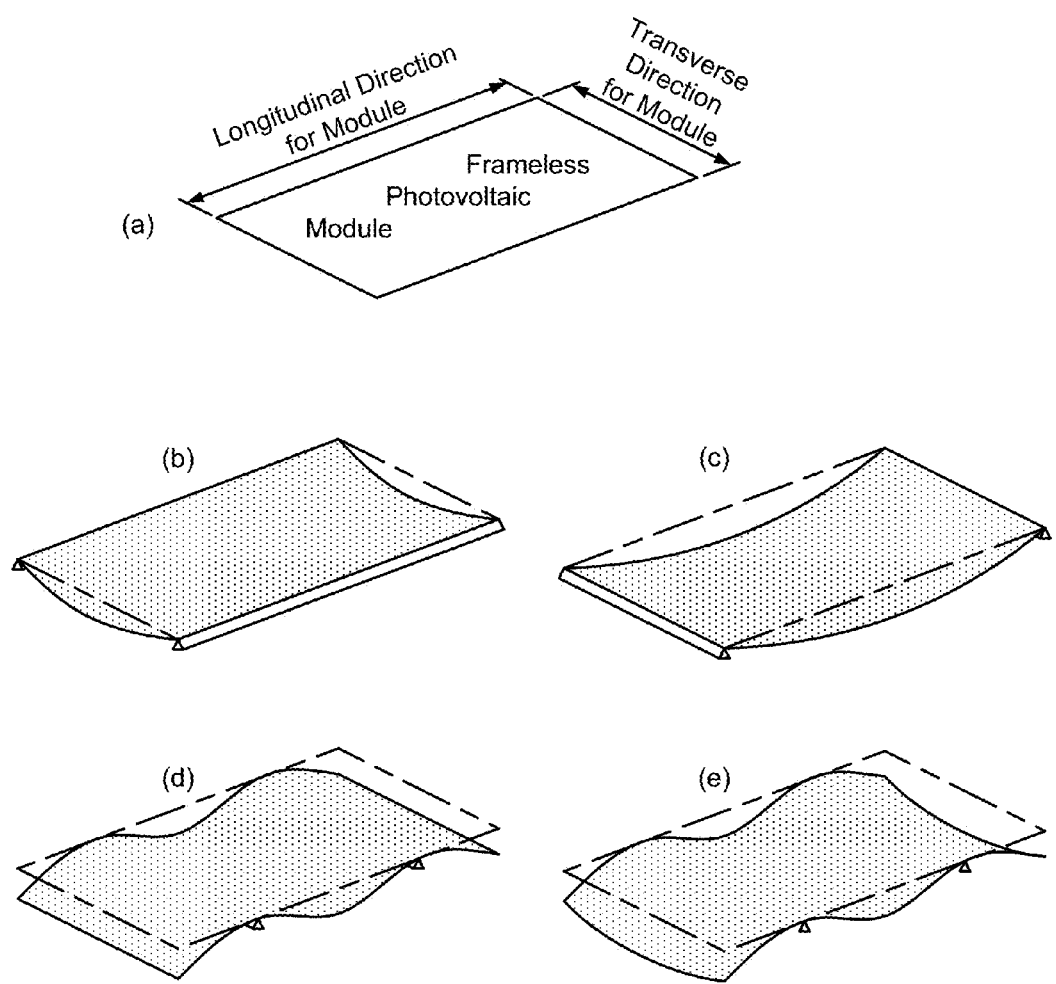
FIG. 1B illustrates orientation conventions referenced in this document with respect to a representative frameless photovoltaic module in accordance with the present invention.

Frameless photovoltaic modules are often rectangular in overall shape, as shown in FIG. 1B. For purposes of discussion, references to frameless photovoltaic modules herein will be made in the context of a rectangular module possessing a longitudinal axis or direction and a transverse axis or direction (as depicted in FIG. 1B, diagram (a)), wherein the longitudinal axis is along the major (larger) dimension of the rectangle and the transverse axis is along the minor (smaller) dimension of the rectangle. Similarly, reference may be made to the length and width of the module. The length of a module refers to the major dimension of the rectangle; the width of a module refers to the minor dimension of the rectangle. Of course, frameless photovoltaic modules may take on a variety of forms departing from a rectangle, and reference to rectangular modules, rectangles, and longitudinal or transverse axes, dimensions, or directions, should not be viewed as limiting the invention only to rectangular modules.

Reference is also made in this application to sagging of a frameless photovoltaic module. In some cases, a module will be described as experiencing sagging along a transverse or longitudinal direction. Sag along a transverse direction refers to sagging behavior which manifests as a non-linear displacement of the module from a line running in a transverse direction, as depicted in FIG. 1A, diagram (b). Sag along a longitudinal direction refers to sagging behavior which manifests as a non-linear displacement of the module from a line running in a longitudinal direction, as depicted in FIG. 1A, diagram (c). A module may sag at multiple points depending on the method of support, as depicted in FIG. 1A, diagram (d). Sag may occur along both transverse and longitudinal directions to different degrees at the same time and result in complex overall displacement, as depicted in FIG. 1A, diagram (e).

Frameless Photovoltaic Module Mounting Rail Systems

Figure 2A:
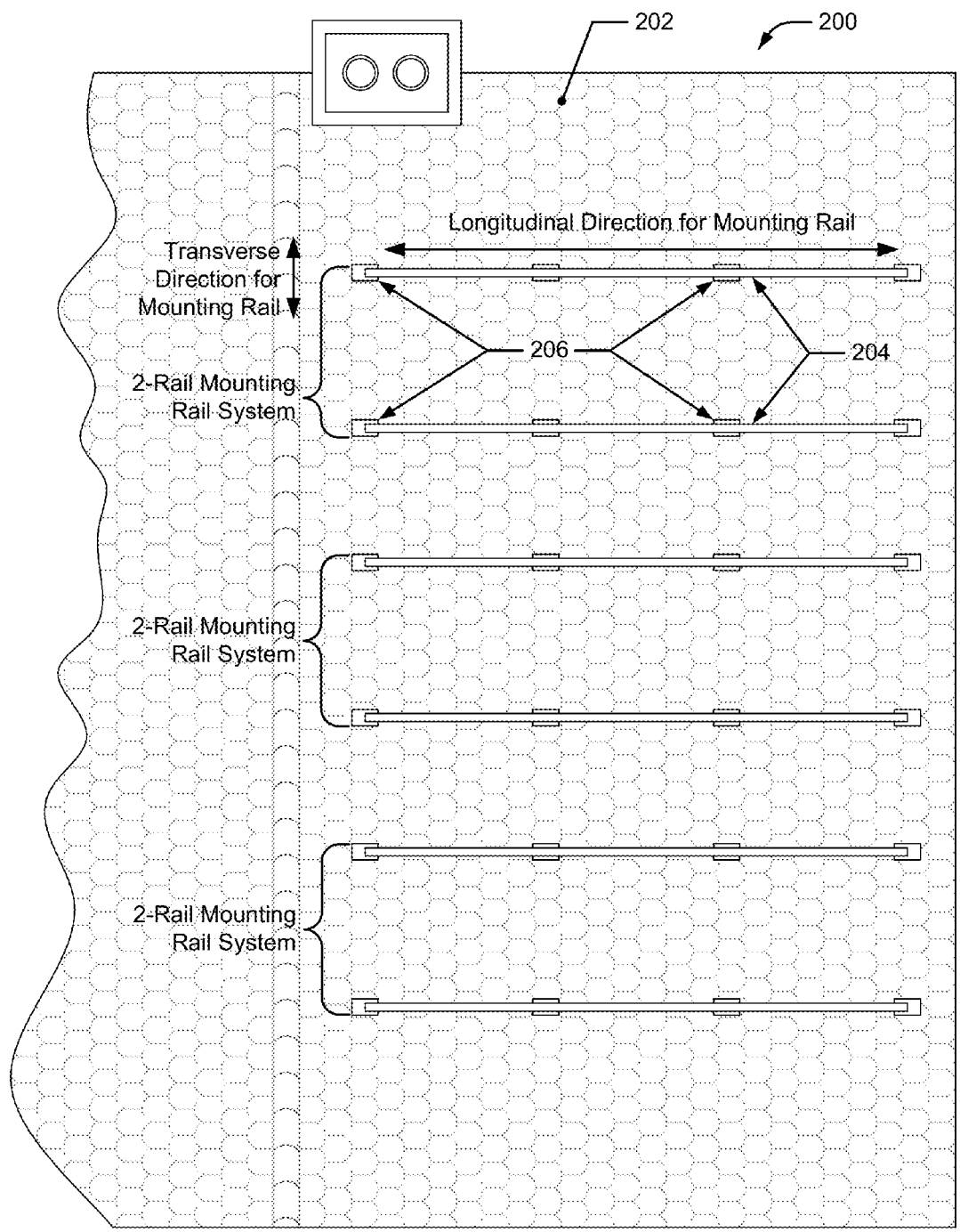
FIG. 2A depicts a partial plan view of an example frameless photovoltaic module mounting rail installation on a household roof.
Figure 2B:
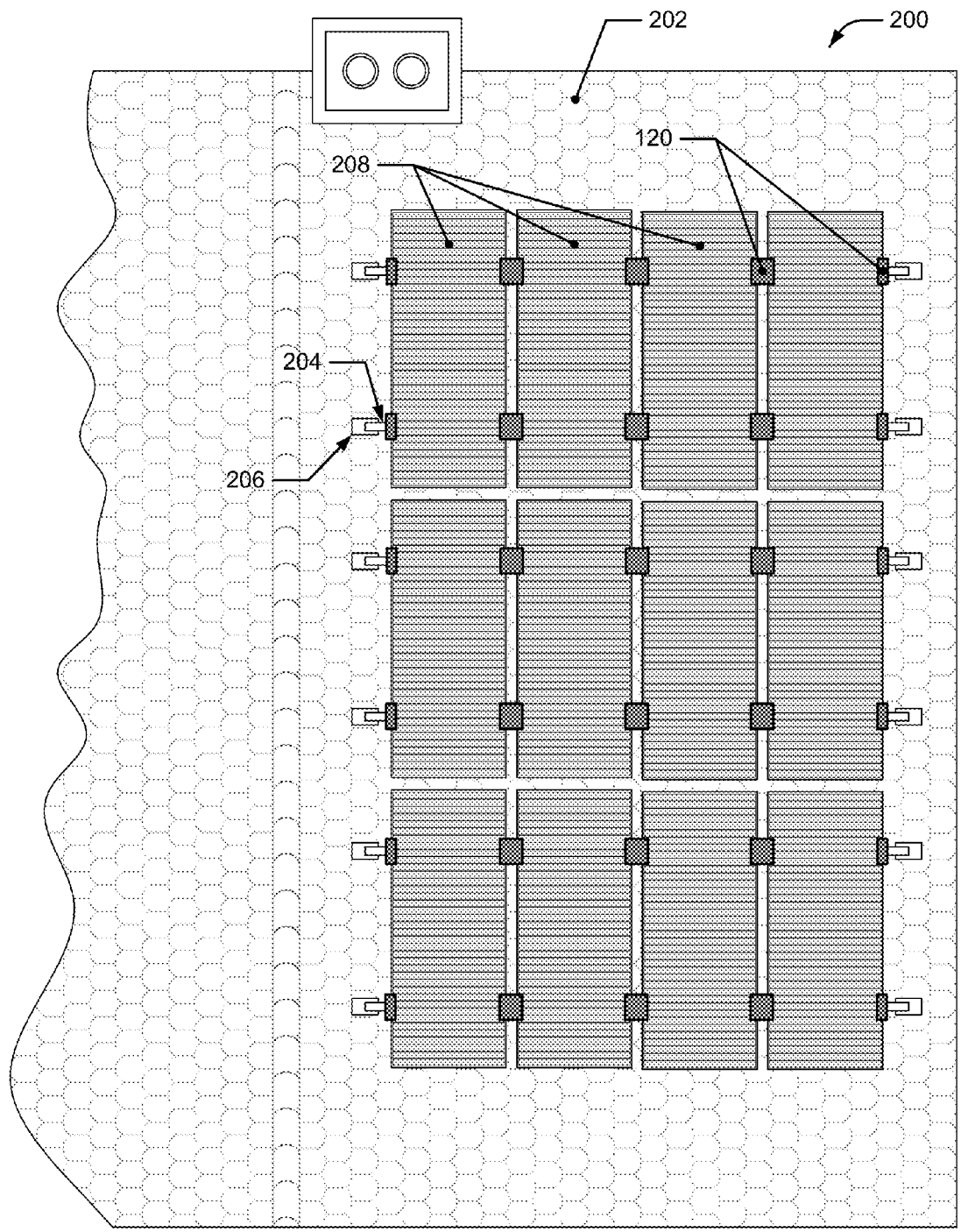
FIG. 2B depicts a partial plan view of an example frameless photovoltaic module mounting rail installation on a household roof with frameless photovoltaic modules installed.

Frameless photovoltaic modules are often mounted onto racking or mounting rail systems when installed at their installation locations. A plan view of an example mounting rail system is shown in FIGS. 2A and 2B. Such mounting rail systems 100 are frequently attached to freestanding support structures, roofs 102, carports, walls, or other structures which receive exposure to sunlight and can support the weight of the mounting rails 104 and installed frameless photovoltaic modules 108. Alternatively, mounting rails may be deployed on freestanding ground-based structures. All such structures are often oriented, or may be re-oriented, to present the mounted frameless photovoltaic modules 108 in an orientation that promotes efficient solar power generation.

In one embodiment, the mounting rail system includes two or more rails 104 which support one or more frameless photovoltaic modules 108. The mounting rails 104 may be substantially longer than the mounting rails 104 are wide or deep. For example, a mounting rail 104 may have overall dimensions of 1" wide by 3" deep, but be 144" long. Several sections of mounting rail 104 may also be connected end-to-end or be butted up to one another to form a much longer mounting rail. The mounting rails 104 may be mounted to a structure, such as roof 102, either directly or using standoffs 106. The mounting rails 104 may also be attached to a supplemental support structure; the supplemental support structure may elevate the rails or position the mounting rails 104 in a more optimum manner (e.g., position the mounting rails 104 such that attached frameless photovoltaic modules 108 will be oriented towards the sun to a greater extent).

The mounting rails 104 may be manufactured from extruded or rolled materials, such as aluminum or steel, or from other materials or using other manufacturing techniques. The mounting rails 104 may be hollow, solid, or filled with material, such as foam or honeycombs. The mounting rails 104 may include grooves, holes, t-slots, or other features which allow for hardware to be attached to the mounting rails 104; these features may provide pre-set hardware position points (e.g., pre-drilled holes) or allow for infinite positioning of hardware locations (e.g., grooves or t-slots).

For purposes of discussion, reference to the longitudinal direction or axis of a mounting rail refers to the direction or axis aligned with the substantially longer dimension of the mounting rail. As illustrated in FIG. 2A, reference to the transverse direction or axis of a mounting rail refers to the direction or axis of the mounting rail perpendicular to the longitudinal direction or axis of the mounting rail and parallel to the face of the mounting rail facing the back face of a mounted module (or simply parallel to the back face of a mounted module in the event that there is no appropriate face of the mounting rail).

Frameless photovoltaic modules mounted to rail mounting systems may experience sagging in areas not directly supported by a mounting rail due to the modules' weight and geometry. In a two-rail mounting system, a frameless photovoltaic module will typically only be externally supported at the two rail locations. At the two rail locations, the frameless photovoltaic module may rest on the rails themselves, which are typically far stiffer than the module and provide external support to the module along contact patches where the module rests on the rails. In areas where the frameless photovoltaic module does not receive external support, the module must be self-supporting, i.e., the module must rely on the material properties and geometry of the module for support.

Due to the nature of the external support provided by rail systems, a frameless photovoltaic module may experience longitudinal sag in the portion of the module between the rails and in the portions of the module cantilevered beyond the rails, i.e., unsupported regions of the module.

The frameless photovoltaic module may also flex such that the module is supported only along the edges of each mounting rail. In such cases, because the module weight may be distributed over a smaller area, i.e., along the edges of the mounting rail rather than over the surface of the mounting rail between the edges of the mounting rail, there may be increased stress at the mounting rail/module interface and increased overall displacement of the module.

Two-rail mounting rail systems are typically spaced according to the L/4 rule, in which the midpoints of the rails are typically positioned at a distance of L/4 from the transverse edges of a module, where L refers to the length of the module. For example, for a 1611 mm×665 mm module, the L/4 distance would be 402.75 mm.

In one embodiment, the transverse midpoint of each rail in a two-rail mounting rail system is instead positioned approximately 22% of the length of the module from the transverse edges of the module. Thus, for a 1611 mm×665 mm module, the midpoints of the mounting rails would be positioned about 354.4 mm from either transverse edge along the longitudinal axis.

More particularly, in a specific embodiment, the midpoint of each mounting rail in a two-rail mounting system may be positioned approximately 22.3% of the length of the module from a transverse edge of the module. In this embodiment, 55.4% of the module would thus be located between the midpoints of the two mounting rails.

Figure 2C:
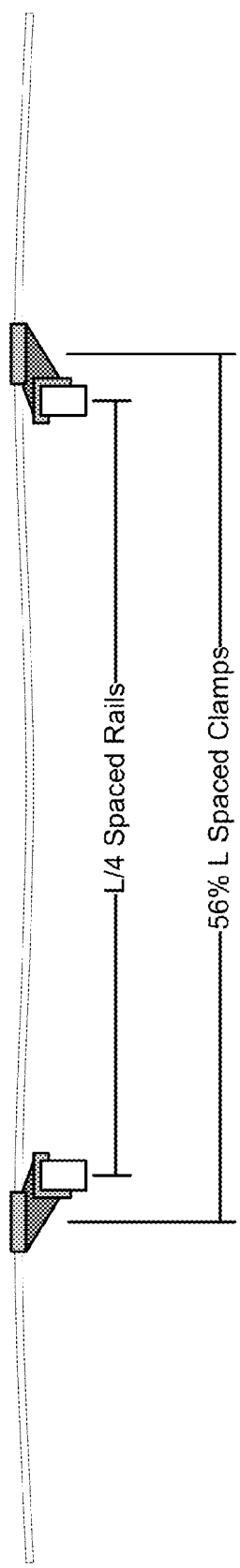
FIG. 2C depicts a cross-sectional view of an example frameless photovoltaic module mounting rail installation where adapters are connected to L/4 spaced rails to achieve clamp spacing of approximately 22% of the length of the module from the transverse edges of the module.

Moreover, while the foregoing description contemplates a mounting configuration in which the clamps and rails are aligned, so that the rail spacing and clamp spacing would be the same, configurations in which the clamps and rails are not aligned are also possible and contemplated as embodiments of the invention. For example, the clamps may be attached to the rails via adaptor brackets, thereby offsetting the overlying clamps from the rails. In such a case, it is the clamps that should be spaced as described above (e.g., the clamps (rather than the rails) positioned approximately 22% of the length of the module from the transverse edges of the module). This configuration may be encountered, for example, in a retrofit of an existing two-rail solar module mounting rail system where adapters are connected to L/4 spaced rails to achieve clamp spacing approximately 22% of the length of the module from the transverse edges of the module, as described above. This embodiment is illustrated in FIG. 2C.

Clamping Systems

Figure 3A:
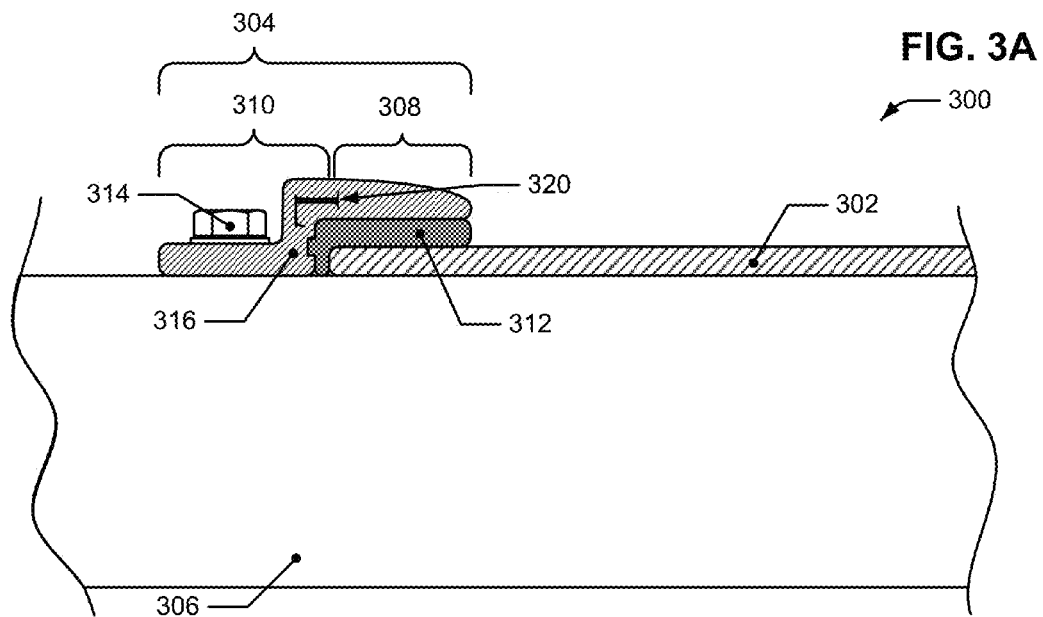
FIG. 3A is a side view of a representative frameless photovoltaic module clamping system.
Figure 3B:
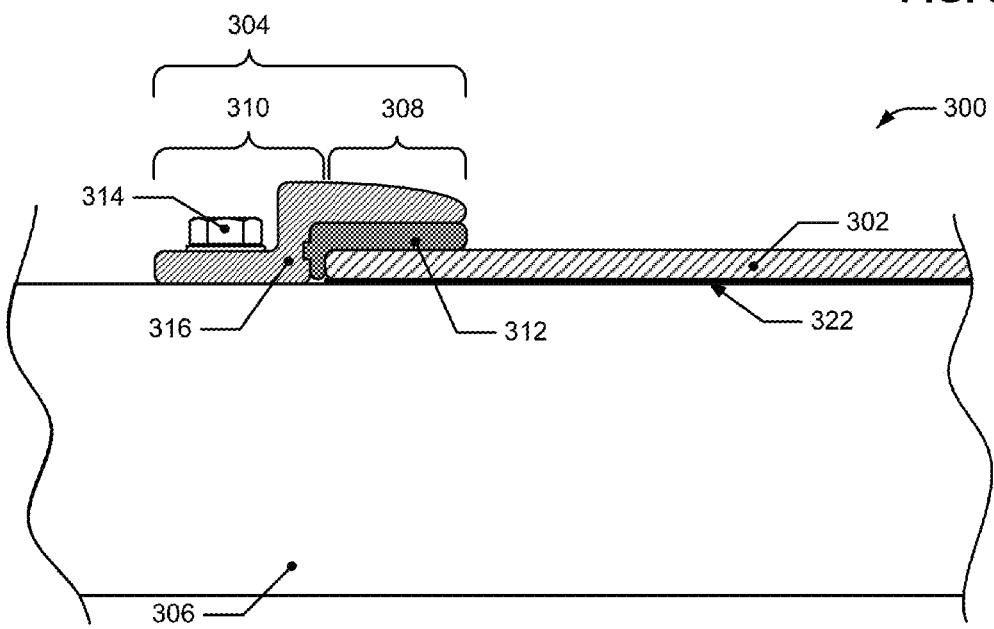
FIG. 3B is a side view of a representative frameless photovoltaic module clamping system in accordance with an embodiment of the present invention.

Frameless photovoltaic modules may be attached to the mounting rails using clamps and/or brackets. FIG. 3A depicts a side view of example clamping arrangement 300. An L-shaped clamp ("L-clamp") 304 may be used; the "L" shape refers to the portion of the clamp engaging the module (letter L 320 in FIG. 3A is provided to illustrate the orientation of the "L," although it should be realized that letter L 320 is provided for illustration purposes only). L-clamp 304 may comprise multiple pieces and may include mounting bracket 316 and elastomeric cushion 312. Mounting bracket 316 may, for example, be made from plastic or metal, such as aluminum. Elastomeric cushion 312 may, for example, be made from an elastomer such as ethylene propylene diene monomer (EPDM) rubber, butyl rubber, or silicone rubber, for example. For example, EDPM rubber having a Shore hardness of 60 A may be used.

The L-clamp 304 may include several regions or portions, including finger 308 and spine 310. The finger 308 refers to the portion of clamp 304 which engages the front of module 302 and the spine 310 refers to the portion of the clamp 304 which does not engage the front of module 302.

The finger 308 may be comprised of a portion of elastomeric cushion 312 and a portion of mounting bracket 316. The spine may be comprised of a portion of elastomeric cushion 312 and a portion of mounting bracket 316. Elastomeric cushion 312 may be configured to engage module 302 along the frontside surface and along an edge surface. Alternatively, elastomeric cushion 312 may be configured to only engage module 302 along the frontside surface. Elastomeric cushion 312 and mounting bracket 316 may include matching boss/relief features which may facilitate maintaining positional alignment between elastomeric cushion 312 and mounting bracket 316. Elastomeric cushion may have a thickness of about 3 mm.

The L-clamp 304 may be configured such that frameless photovoltaic module 302 may be sandwiched between L-clamp 304 and mounting rail 302 after installation, as shown in FIG. 3A. Mounting bracket 316 may be attached to mounting rail 306 using mounting bolt 314. Mounting bolt 314 may be tightened to draw mounting bracket 316 against mounting rail 306 and to compress the elastomeric cushion portion in finger 308 to grip frameless photovoltaic module 302 with a desired clamping force but in a compliant manner.

By clamping module 302 directly against mounting rail 306, transverse sag of the module due to mounting is effectively eliminated, and stress concentrations decreased.

Interface Material

In some implementations, interface material 322 may be introduced between frameless photovoltaic module 302 and mounting rail 306, to which module 302 is attached. Interface material 322 may be selected to provide a mechanical interface which further mitigates module stress or otherwise increases module stability and longevity.

In one implementation, interface material 322 is selected from materials such as silicone-based polymers, butyl rubbers, acrylic foam tape, or polyurethane. In another implementation, material 322 may comprise an adhesive such as a silicone adhesive or a UV-stable adhesive. Interface material 322 may also comprise a mixture of different materials. For example, interface material 322 may be comprised of a layer of butyl rubber and a layer of silicone adhesive.

Interface material 322 may be any of several different thicknesses. Preferably, the thickness of interface material 322 is minimized so as to reduce material usage and displacement due to compression. Excessive compression in the interface material may result in stress risers in the vicinity of L-clamp 304. Interface material 322 may not have a predetermined thickness. For example, interface material 322 may comprise a layer of silicone adhesive. During assembly the silicone adhesive may be compressed between module 302 and mounting rail 306 to an unpredictable amount.

Interface material 322 may serve as a vibration damper and prevent debris from lodging between module 302 and mounting rail 306. Dust and other particulate matter which lodges between module 302 and mounting rail 306 may abrade module 302 during vibratory motion of the module, such as may be experienced due to wind loading. Such abrasive behavior may damage module 302. Interface material 322 may mitigate such concerns. For example, if interface material 322 comprises a silicone adhesive, interface material may provide a compliant mechanical interface between module 302 and mounting rail 306 which dampens much of module 302's vibration. Interface material 322 may also physically prevent dust and other abrasive agents from entering the interface between module 302 and mounting rail 306.

Interface material 322 may also provide mounting support in addition to that provided by L-clamps 304. For example, module 302 may experience longitudinal sag due to gravitational loading. Module 302 may also experience periodic longitudinal sag due to vibration, such as from wind loading. Such longitudinal sag may generate substantial longitudinal loading at the clamp/module engagement areas, and may result in longitudinal slippage of the module relative to the clamps. This may allow the module to sag further, generating undesired stresses or allowing the module to contact undesired surfaces, such as support structure upon which the mounting rails are mounted. Interface material 322 may provide additional frictional loading which may act to prevent slippage. Alternatively, interface material 322 may form a mechanical bond between module 302 and mounting rail 306. In such situations, the lap shear strength of interface material 302 may significantly augment the clamping force provided by clamps 304. For example, a silicone adhesive with a lap shear strength of 250 psi applied as an interface material between a mounting rail 1" in width and a module with a transverse width of 26" could mitigate up to 6500 lbs of longitudinal loading on the module at the module/clamp interface.

Example Modeling

Modeling was conducted in order to demonstrate the advantages provided by various aspects of this invention with regard to the positioning of the mounting rails. The data presented here are intended to better illustrate the invention as described herein and are non-limiting.

Figure 4A:
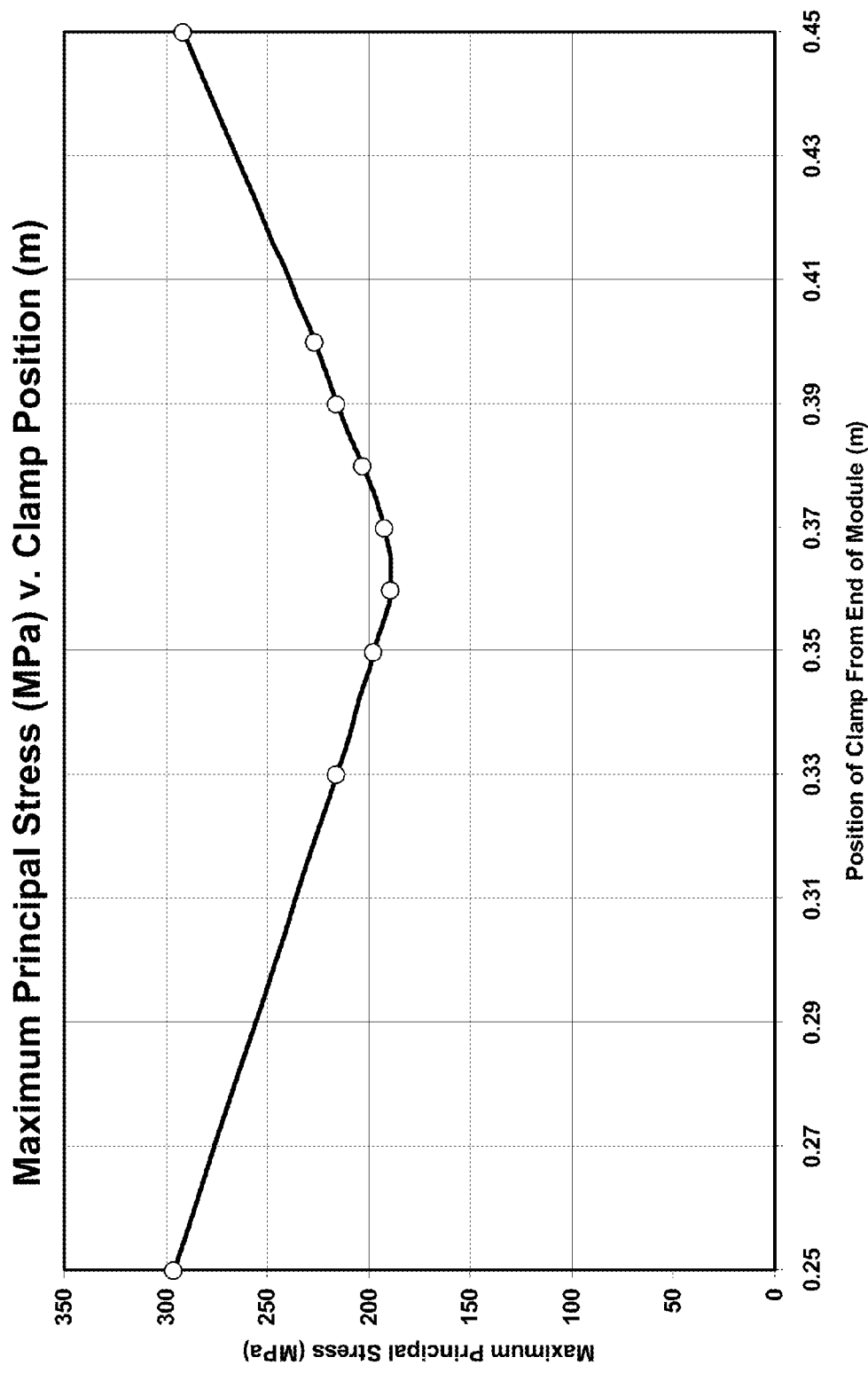
FIG. 4A is a plot of an analysis of the stress in a representative frameless photovoltaic module when installed with various mounting rail positions.

FIG. 4A depicts a plot of the maximum principal stress experienced by a typical module depending on the distance the clamps are from the transverse edge of the module. For the analyzed module, positioning mounting rails at approximately 22% of the longitudinal length of the module from either transverse edge reduced the resulting maximum principal stress by approximately 37 MPa relative to the stress induced by a L/4 rail spacing.

Figure 4B:
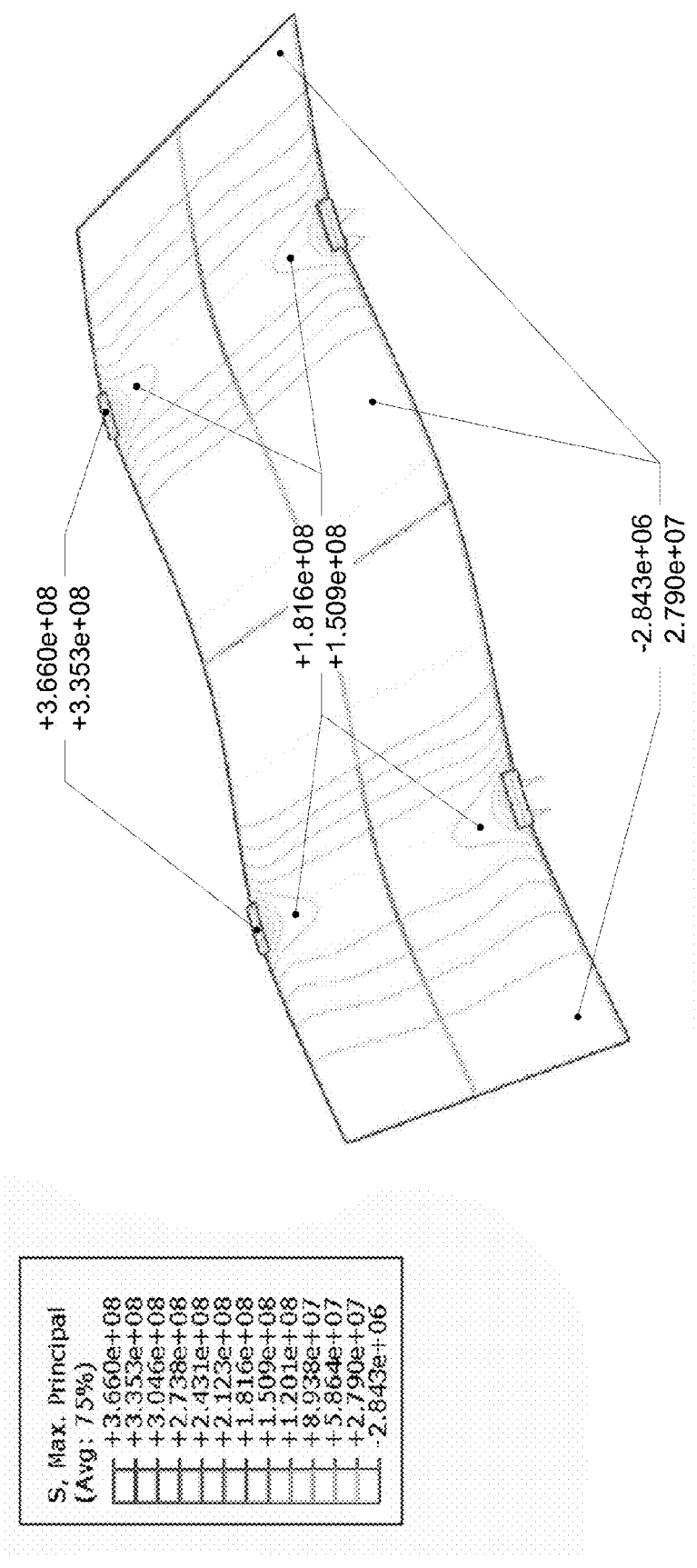
FIG. 4B is a stress contour plot of a representative frameless photovoltaic module and clamping system.

FIG. 4B is a stress contour plot of an example frameless photovoltaic module supported by two mounting rails, each rail attached to the module via two edge clamps. The rail spacing in this plot is approximately 22% of the module longitudinal length from either transverse edge. The combination of sag loading and localized stress concentrations in the regions of the edge clamps results in a peak principal stress of 366 MPa.

Example Installation Process

Figure 5:
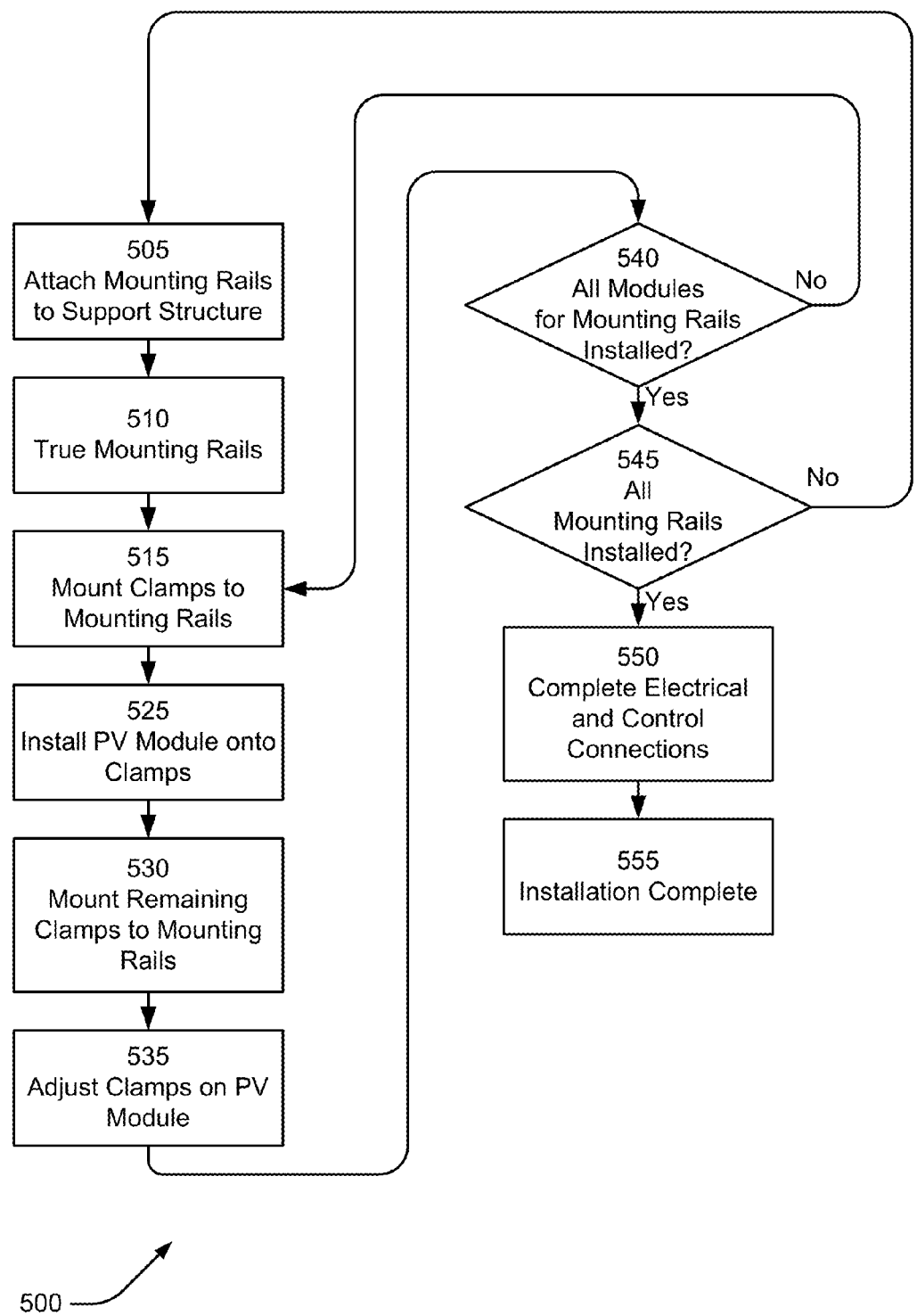
FIG. 5 is a flow diagram for a frameless photovoltaic module installation process in accordance with an embodiment of the invention utilizing the methods and equipment discussed in this application.

An example installation process utilizing mounting rail systems in conjunction with L-clamps is diagrammed in FIG. 5. It should be noted that not all of the operations depicted and described are necessarily part of a process in accordance with the present invention; an installation process in accordance with the invention may include all or just some of the operations described. A number of the operations are provided for context to facilitate description and understanding of the invention, but are optional in some embodiments.

Installation process 500 begins with the installation of mounting rails onto a support structure. This may include attaching one or more mounting rails to a roof, carport, or other support structure. Standoffs and mounting hardware may be used to implement the attachment. In the case of a pre-existing mounting rail installation, such as in a retrofit, re-installation of the mounting rails may not be necessary.

In step 510, the mounting rails may be trued to remove any gross variation in mounting rail parallelity and levelness.

In step 515, module clamping hardware is mounted to the installed mounting rails. Of course, the clamping hardware may also be installed prior to truing 510 or prior to rail installation 505. In some cases, only the clamps which will engage one longitudinal side of a module will initially be installed. In other cases, all clamps for a module will be installed. The clamps may be securely attached to the mounting rails.

In step 520, an interface material is installed onto the mounting rails. Alternatively, the interface material may be installed onto the module or to both the module and the mounting rails. The interface material may be installed on the rails or on the modules at any point in time before the modules are installed in step 525. In embodiments wherein an interface material is not used, step 520 may be omitted.

In step 525, a module is installed into the mounted clamps. Installing a module may involve sliding the module in a transverse direction into the gap between the clamp finger and the mounting rail. Alternatively, the module may be installed onto the mounting rails and any mounted clamps may then be slid into position to engage the frontside of the module.

In step 530, any remaining clamps, or clamp components, required to secure the module are installed.

In step 535, the clamps are adjusted to ensure uniformity in clamping force and position.

In step 540, the installation process returns to step 515 if any modules remain which will be installed on the installed mounting rails.

In step 545, the installation process returns to step 505 if there are any mounting rails remaining to be installed.

In step 550, electrical and control connections are made to the mounted modules, and any support electronics are installed and configured. In step 555, the mechanical installation is complete.

Of course, the above steps are merely examples of an installation process using the described technology. The ordering of the steps may be changed significantly—for example, it is not necessary to install the modules for one set of rails before installing a second set of rails. The order set forth in FIG. 5 should not be construed as limiting in any way.

CONCLUSION

Although the foregoing invention has been described in some detail for purposes of clarity of understanding, it will be apparent that certain changes and modifications may be practiced within the scope of the invention. It should be noted that there are many alternative ways of implementing both the processes and apparatuses of the present invention. Accordingly, the present embodiments are to be considered as illustrative and not restrictive, and the invention is not to be limited to the details given herein.

What is claimed is:

1. A photovoltaic assembly comprising:
    a frameless photovoltaic module comprising a frontside sheet and a backside sheet;
    a mounting structure comprising module mounting rails; and
    clamps attached to two rails of the mounting structure and engaging the frontside sheet of the frameless photovoltaic module at edge regions of the module overlying the two rails, thereby securing the frameless photovoltaic module on the mounting structure, wherein the frameless photovoltaic module is supported substantially across a transverse width of the frameless photovoltaic module by each of the two rails; and
    wherein each of the clamps comprises a mounting bracket and an elastomeric cushion, the elastomeric cushion disposed between and in direct physical contact with the mounting bracket and the frontside sheet, the elastomeric cushion consisting of a substantially L-shape consisting of a finger portion oriented substantially parallel to and in direct physical contact with the frontside sheet surface of the module and a spine portion oriented substantially perpendicular to the finger portion and in direct physical contact with an edge surface of the module;
    whereby each of the clamps directly clamps the module against one of the mounting rails without creating a gap between the backside of the module and the one of the mounting rails.

2. The photovoltaic assembly of claim 1, wherein the spine portion of the elastomeric cushion and mounting bracket include matching boss/relief features to facilitate maintaining positional alignment between the elastomeric cushion and the mounting bracket.

3. The photovoltaic assembly of claim 1, wherein the mounting bracket is made from a material selected from the group consisting of plastic and metal, and the material of the elastomeric cushion is selected from the group consisting of ethylene propylene diene monomer (EPDM) rubber, butyl rubber and silicone rubber.

4. The photovoltaic assembly of claim 1, wherein the mounting bracket is made of aluminum, and the material of the elastomeric cushion is EPDM rubber.

5. The photovoltaic assembly of claim 2, wherein the elastomeric cushion is about 3 mm thick.

6. The photovoltaic assembly of claim 1, wherein the frontside sheet is a glass sheet.

7. The photovoltaic assembly of claim 6, wherein the backside sheet is a glass sheet.

8. The photovoltaic assembly of claim 6, wherein the backside sheet is a non-glass flexible sheet.

9. The photovoltaic assembly of claim 1, wherein the points of engagement of the clamps at the edges of the module top sheet are positioned with a spacing about 22% of the module length from each end of the module.

10. The photovoltaic assembly of claim 9, wherein the rails and the clamps are aligned such that the rails are positioned with a spacing about 22% of the module length from each end of the module.

11. The photovoltaic assembly of claim 9, wherein the clamps are offset from the rails, such that the rails are positioned with a spacing different than about 22% of the module length from each end of the module.

12. The photovoltaic assembly of claim 1, wherein the frameless photovoltaic module comprises a plurality of interconnected copper indium gallium selenide (CIGS) cells.

13. A method of installing a frameless photovoltaic module comprising a frontside sheet and a backside sheet onto a mounting structure, the method comprising:
- providing the mounting structure comprising module mounting rails;
- positioning the module backside sheet, wherein the module is supported substantially across a transverse width of the module by each of two rails; and
- securing the frameless photovoltaic module onto the mounting structure with clamps attached to the two rails of the mounting structure and engaging the frontside of the frameless photovoltaic module at edge regions of the module overlying the two rails; and
- wherein each of the clamps comprises a mounting bracket and an elastomeric cushion, the elastomeric cushion disposed between and in direct physical contact with the mounting bracket and the frontside sheet, the elastomeric cushion consisting of a substantially L-shape consisting of a finger portion oriented substantially parallel to and in direct physical contact with the frontside sheet surface of the module and a spine portion oriented substantially perpendicular to the finger portion and in direct physical contact with an edge surface of the module;
- whereby each of the clamps holds the module directly against one of the mounting rails without creating a gap between the backside of the module and the one of the mounting rails.

14. The method of claim 13, wherein the points of engagement of the clamps at the edges of the module top sheet are positioned with a spacing about 22% of the module length from each end of the module.

15. The method of claim 14, wherein the rails and the clamps are aligned such that the rails are positioned with a spacing about 22% of the module length from each end of the module.

16. The method of claim 14, wherein the clamps are offset from the rails, such that the rails are positioned with a spacing different than about 22% of the module length from each end of the module.

17. A photovoltaic assembly, comprising:
- a frameless photovoltaic module comprising a frontside glass sheet and a backside non-glass flexible sheet;
- a mounting structure comprising module mounting rails; and
- L-shaped clamps aligned with and attached to two rails of the mounting structure and engaging the frontside sheet of the frameless photovoltaic module at edge regions of the module overlying the two rails, wherein the frameless photovoltaic module is supported substantially across a transverse width of the frameless photovoltaic module by each of the two rails, thereby securing the frameless photovoltaic module on the mounting structure; and
- wherein each of the clamps comprises a mounting bracket and an elastomeric cushion, the elastomeric cushion disposed between and in direct physical contact with the mounting bracket and the frontside sheet, the elastomeric cushion consisting of a substantially L-shape consisting of a finger portion oriented substantially parallel to and in direct physical contact with the frontside sheet surface of the module and a spine portion oriented substantially perpendicular to the finger portion and in direct physical contact with an edge surface of the module;
- whereby each of the clamps directly clamps the module against one of the mounting rails without creating a gap between the backside of the module and the one of the mounting rails.

18. The photovoltaic assembly of claim 17, wherein the points of engagement of the clamps at the edges of the module top sheet are positioned with a spacing about 22% of the module length from each end of the module.

19. The photovoltaic assembly of claim 18, wherein the rails and the clamps are aligned such that the rails are positioned with a spacing about 22% of the module length from each end of the module.

20. The photovoltaic assembly of claim 18, wherein the clamps are offset from the rails, such that the rails are positioned with a spacing different than about 22% of the module length from each end of the module.

* * * * *